United States Patent
Jang et al.

(10) Patent No.: US 12,277,217 B2
(45) Date of Patent: Apr. 15, 2025

(54) METHOD FOR APPLICATION SECURITY AND ELECTRONIC DEVICE FOR PERFORMING THE SAME

(71) Applicant: Samsung Electronics Co., Ltd., Suwon-si (KR)

(72) Inventors: Min Jang, Suwon-si (KR); Yuna Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/957,260

(22) Filed: Sep. 30, 2022

(65) Prior Publication Data

US 2023/0161872 A1    May 25, 2023

Related U.S. Application Data

(63) Continuation of application No. PCT/KR2022/013509, filed on Sep. 8, 2022.

(30) Foreign Application Priority Data

Nov. 23, 2021 (KR) .......... 10-2021-0162293

(51) Int. Cl.
    *G06F 21/54* (2013.01)
(52) U.S. Cl.
    CPC ........ *G06F 21/54* (2013.01); *G06F 2221/034* (2013.01)
(58) Field of Classification Search
    CPC .... G06F 21/54; G06F 2221/034; G06F 21/51; G06F 21/53
    See application file for complete search history.

(56) References Cited

U.S. PATENT DOCUMENTS 10,152,594 B2    12/2018  Wang et al.
2015/0113461 A1*  4/2015  Kasten .............. G06F 3/0484
                                              715/771

(Continued)

FOREIGN PATENT DOCUMENTS

KR    10-2013-0021892 A    3/2013
KR    10-2013-0085722 A    7/2013

(Continued)

OTHER PUBLICATIONS

International Search Report dated Dec. 9, 2022, issued in International Application No. PCT/KR2022/013509.

*Primary Examiner* — El Hadji M Sall
(74) *Attorney, Agent, or Firm* — Jefferson IP Law, LLP

(57) ABSTRACT

A method for application security and an electronic device for performing the method are provided. The electronic device includes a memory configured to store computer-executable instructions and at least one processor configured to execute the instructions by accessing the memory, wherein the at least one processor is configured to, in response to the instructions being executed by the at least one processor, record a source type of an application based on the source type of the application when installing the application on the electronic device, determine whether the application corresponds to an untrusted application based on the source type of the application, and in response to the application corresponding to an untrusted application, perform one or more of security functions set for the untrusted application.

19 Claims, 10 Drawing Sheets

(56) References Cited

U.S. PATENT DOCUMENTS

| | | |
|---|---|---|
| 2016/0321452 A1 | 11/2016 | Richardson et al. |
| 2017/0011220 A1 | 1/2017 | Efremov et al. |
| 2017/0161496 A1 | 6/2017 | Wang et al. |
| 2018/0189478 A1* | 7/2018 | Richardson ......... H04W 12/122 |

FOREIGN PATENT DOCUMENTS

| | | |
|---|---|---|
| KR | 10-2013-0116409 A | 10/2013 |
| KR | 1324919 B1 | 11/2013 |
| KR | 1326896 B1 | 11/2013 |
| KR | 1445302 B1 | 9/2014 |
| KR | 10-2016-0001208 A | 1/2016 |
| KR | 10-2016-0033510 A | 3/2016 |

\* cited by examiner (a)

(b)

(c)

(a)

(b)

(c)

METHOD FOR APPLICATION SECURITY AND ELECTRONIC DEVICE FOR PERFORMING THE SAME

CROSS-REFERENCE TO RELATED APPLICATION(S)

This application is a continuation application, claiming priority under § 365(c), of an International application No. PCT/KR2022/013509, filed on Sep. 8, 2022, which is based on and claims the benefit of a Korean patent application number 10-2021-0162293, filed on Nov. 23, 2021, in the Korean Intellectual Property Office, the disclosure of which is incorporated by reference herein in its entirety.

BACKGROUND

1. Field

The disclosure relates to application security technology.

2. Description of Related Art

There are various application operating systems including Android and iPhone operating system (iOS). Android differs from iOS in that it allows sideloading. Sideloading may refer to the installation of applications from various sources, as well as the installation of applications from official application stores. On Android, applications from various sources, as well as applications distributed from official application stores, may be installed and executed through sideloading.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclose is to provide to classify an application installed from an untrusted source among applications from various sources and perform a security function for the application installed from the untrusted source, such that a security environment of an electronic device in which an application is executed may be improved.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store computer-executable instructions and at least one processor configured to execute the instructions by accessing the memory. In response to the instructions being executed by the at least one processor, the at least one processor may be configured to record a source type of an application based on the source type of the application when installing the application on the electronic device and determine whether the application corresponds to an untrusted application based on the source type of the application. In response to the application corresponding to an untrusted application, the at least one processor may be configured to perform one or more of security functions set for the untrusted application.

In accordance another aspect of the disclosure, a method for application security is provided. The method includes receive a request to install an application. The method may record a source type of the application based on a source of the application in response to receiving the installation request. The method may install the application on an electronic device. The method may determine whether the application corresponds to an untrusted application based on the source type of the application. In response to the application corresponding to an untrusted application, the method may perform one or more of security functions set for the untrusted application.

According to an embodiment, security vulnerabilities caused by sideloading on Android may be reduced, and an environment in which an electronic device, such as a smartphone, may be protected from malicious code and safely used may be provided.

In addition, according to another embodiment, a user may effectively recognize a list and a risk of applications installed from untrusted sources and easily remove the applications if necessary.

Furthermore, according to yet another embodiment, it may be possible to reduce the risk of malicious code and the possibility of personal information leakage caused by malicious applications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
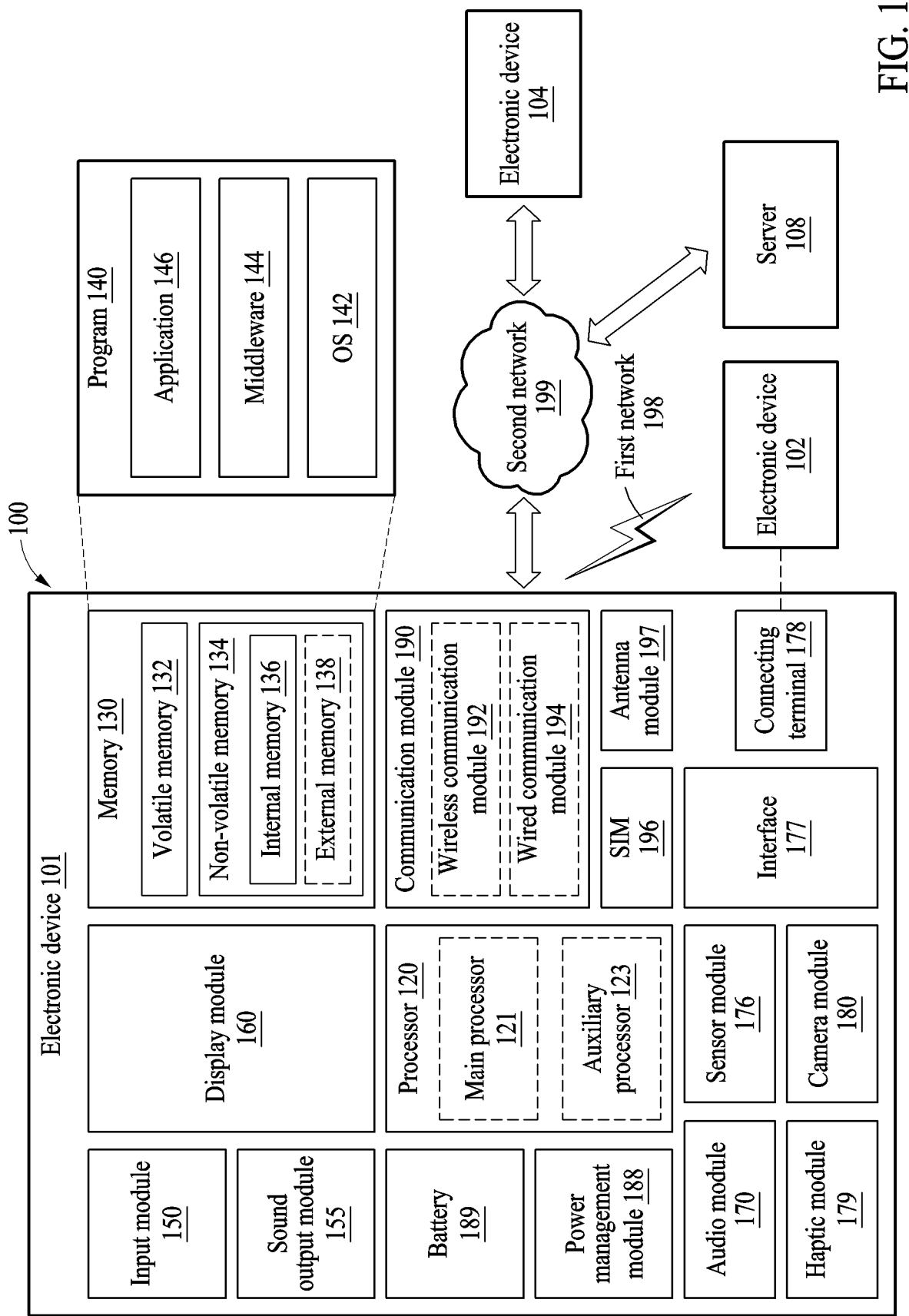
FIG. 1 is a block diagram illustrating an electronic device according to an embodiment of the disclosure.

FIG. 1 is a block diagram illustrating an electronic device 101 according to an embodiment of the disclosure.

Referring to FIG. 1, the electronic device 101 in the network environment 100 may communicate with an electronic device 102 via a first network 198 (e.g., a Bluetooth communication and a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108.

According to another example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197, and the like. In some example embodiments, at least one of the components (e.g., the connecting terminal 178) may be omitted from the electronic device 101, or one or more other components may be added in the electronic device 101. In other example embodiments, some of the components (e.g., the sensor module 176, the camera module 180, or the antenna module 197) may be integrated as a single component (e.g., the display module 160).

According to yet another example embodiment, the processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to another example embodiment, the processor 120 may include one or more processors such as a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, and a communication processor (CP)), and the like, that may be operable independently of, or in conjunction with the main processor 121. In an example embodiment, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

In an embodiment, the auxiliary processor 123 may control at least some of functions or states related to at least one (e.g., the display module 160, the sensor module 176, or the communication module 190) of the components of the electronic device 101, instead of the main processor 121 while the main processor 121 may be in an inactive (e.g., sleep) state or along with the main processor 121 while the main processor 121 may be an active state (e.g., executing an application). According to another embodiment, the auxiliary processor 123 (e.g., an ISP or a CP) may be implemented as a portion of another component (e.g., the camera module 180 or the communication module 190) that may be functionally related to the auxiliary processor 123. According to yet another embodiment, the auxiliary processor 123 (e.g., an NPU) may include a hardware structure specified for artificial intelligence model processing. An artificial intelligence model may be generated by machine learning. The machine learning may be performed by, for example, the electronic device 101, in which artificial intelligence may be performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, and the like, or a combination of two or more thereof, but examples of which are not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may store machine-readable computer-executable instructions. The processor 120 may execute the machine-readable instructions by accessing the memory 130. The memory 130 may include the volatile memory 132 or the non-volatile memory 134.

The program 140 may be stored as software or machine-readable computer-executable instructions in the memory 130, and may include, for example, an operating system (OS) 142, middleware 144, an application 146, and the like. The application 146 may be an application installed on the electronic device 101 to be executed, and the types of application may not be limited thereto. The application 146 may be referred to as an "app" for short.

The input module 150 may be configured to receive, from the outside (e.g., a user) the electronic device 101, a command or data to be used by another component (e.g., the processor 120) of the electronic device 101. The input module 150 may include, for example, a microphone, a mouse, a keyboard, a key (e.g., a button), a digital pen (e.g., a stylus pen), and the like.

The sound output module 155 may be configured to output a sound signal to the outside the electronic device 101. The sound output module 155 may include, for example, a speaker or a receiver. The speaker may be used for general purposes, such as playing multimedia or playing a record. The receiver may be used to receive an incoming call. According to an embodiment, the receiver may be implemented separately from the speaker or as a part of the speaker.

The display module 160 may be configured to visually provide information to the outside (e.g., a user) of the electronic device 101. The display module 160 may include, for example, a control circuit for controlling a display, a hologram device, or a projector and control circuitry to control a corresponding one of the displays, the hologram device, and the projector. According to another embodiment, the display module 160 may include a touch sensor adapted to sense a touch, or a pressure sensor adapted to measure an intensity of a force incurred by the touch.

The audio module 170 may be configured to convert a sound into an electric signal or vice versa. According to yet another embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may be configured to detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a location sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may be configured to support one or more of specified protocols to be used by the electronic device 101 to couple with the external electronic device (e.g., the electronic device 102) directly (e.g., by wire) or wirelessly. According to another embodiment, the interface 177 may include, for example, a high-definition multimedia interface (HDMI), a universal serial bus (USB) interface, a secure digital (SD) card interface, or an audio interface.

The connecting terminal 178 may be configured to include a connector via which the electronic device 101 may be physically connected to an external electronic device (e.g., the electronic device 102). According to yet another embodiment, the connecting terminal 178 may include, for example, an HDMI connector, a USB connector, an SD card connector, an audio connector (e.g., a headphone connector), and the like.

The haptic module 179 may be configured to convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, an electric stimulator, and the like.

The camera module 180 may be configured to capture a still image and moving images. According to another embodiment, the camera module 180 may include one or more lenses, image sensors, ISPs, flashes, and the like.

The power management module 188 may be configured to manage power supplied to the electronic device 101. According to yet another embodiment, the power management module 188 may be implemented as, for example, at least a part of a power management integrated circuit (PMIC).

The battery 189 may be configured to supply power to at least one component of the electronic device 101. According to an embodiment, the battery 189 may include, for example, a primary cell which may not be rechargeable, a secondary cell which may be rechargeable, a fuel cell, and the like.

The communication module 190 may be configured to support establishing a direct (e.g., by wire) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, a power line communication (PLC) module), and the like. A corresponding one of these communication modules may communicate with the external electronic device 104 via the first network 198 (e.g., a short-range communication network, such as Bluetooth™, wireless-fidelity (Wi-Fi) direct, or infrared data association (IrDA) or the second network 199 (e.g., a long-range communication network, such as a legacy cellular network, a $5^{th}$ generation (5G) network, a next-generation communication network, the Internet, or a computer network (e.g., a LAN or a wide area network (WAN))). These various types of communication modules may be implemented as a single component (e.g., a single chip), or may be implemented as different multiple chips (e.g., multiple chips). The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may be configured to transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to another example embodiment, the antenna module 197 may include a plurality of antennas (e.g., array antennas). At least one antenna appropriate for a communication scheme may be used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to yet another example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type than the electronic device 101. According to another embodiment, all or some of operations to be executed by the electronic device 101 may be executed at one or more of external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more of external electronic devices to perform at least part of the function or service. The one or more of external electronic devices receiving the request may perform the at least part of the function or service, or an additional function or an additional service related to the request, and may transfer an outcome of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device.

The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In an example embodiment, the electronic device 101 may operate on Android. Sideloading through which the application 146 from various sources may be installed may be allowed on Android. As Android, on which the electronic device 101 operates, allows sideloading, there may be a concern that a malicious application (e.g., an application that leaks or collects personal information or an application that allows an operation not intended by a user of the electronic device 101) that threatens security of the electronic device 101 may be installed and executed on the electronic device 101. Sideloading may lead to issues, such as failing to inform the user in detail that an application may attack or allowing key permissions for an application installed from an untrusted source. There may be a need for technical solutions to decrease security vulnerabilities on Android and to provide an environment that allows the user to use the electronic device 101 safely. An example in which the electronic device 101 operates on Android is described, but example embodiments may apply to any operating system that allows sideloading in addition to Android without limitation.

According to example embodiments described hereinafter, the electronic device 101 may provide a solution according to a source type by classifying a source type of the application 146 when installing the application 146. The electronic device 101 may classify a source type based on a source of the application 146 at a time at which the application 146 may be being installed and may manage applications classified as an untrusted application. The above-mentioned application management may involve performing a security function or security policy preset for an untrusted application. For example, the electronic device 101 may classify the source of the application 146 according to a source type and inform a user of a risk of the untrusted application (e.g., a risk of the application being installed from an unknown source). In addition, the electronic device 101 may provide a list of applications that pose a security threat and related information to the user and may guide the user how to easily remove the applications. Furthermore, the electronic device 101 may provide a function of removing or retrieving permission granted to the untrusted application such that a potential risk of the untrusted application may be prevented. Therefore, the electronic device 101 may provide a safe environment to a user through security functions such as notifying the user of a risk of an application being installed from an untrusted source and removing permission for the application in advance if necessary.

According to an embodiment, in response to the instructions stored in the memory 130 being executed by the processor 120, the processor 120 may record the source type of the application 146 based on the source of the application 146 when installing the application 146 on the electronic device 101. The processor 120, for example, may determine the source type of the application 146 based on source information of the application 146 appearing in a package setting file (e.g., packages.xml) of the application 146 and record the determined source type in the package setting file (e.g., packages.xml). Source types of various applications may be recorded in the package setting file, and the processor 120 may identify the source types of the applications through the package setting file.

The processor 120 may classify the source type of the application 146 as one of a trusted application, an untrusted application, and a default application based on the source information of the application 146. In response to the application 146 being included in an allowlist, a list of trusted applications, the processor 120 may determine that the application 146 may be a trusted application regardless of the source type of the application 146. In response to the application 146 corresponding to a default application, the processor 120 may treat the application 146 as a trusted application regardless of the source type of the application 146. The processor 120 may provide application information including the source type of the application 146 to a user.

In an example embodiment, in response to the source type of the application 146 corresponding to an untrusted application, the processor 120 may output, on a screen, a symbol (or a text) indicating that the application 146 may be an untrusted application. In response to an icon of the application 146 being present, the processor 120 may output a symbol, overlaying the symbol on the icon of the application 146, or may only output the symbol without outputting the icon. In response to an icon of the application 146 being absent (e.g., when the application being installed has no icon), the processor 120 may only output the symbol. If the application 146 has no separate icon, the processor 120 may output, on a screen, a symbol indicating that the application 146 may be an untrusted application by displaying the symbol as the icon of the application 146.

The processor 120 may determine whether the application 146 corresponds to an untrusted application based on the source type of the application 146. The processor 120 may classify the application 146 based on the source type of the application 146. The processor 120 may only perform a task of classifying applications or may further perform a security function appropriate for the applications based on a classification result.

In response to an application to be executed corresponding to an untrusted application, the processor 120 may perform one or more of security functions set for an untrusted application. For example, the processor 120 may perform one or more of following operations as a security function.

The processor 120 may output a notification window to notify the user of a security risk of the untrusted application. In addition, the processor 120 may perform a function of outputting a selection window, as a security function, to receive, from the user, a selection of whether to grant the untrusted application permission whenever a request to execute the untrusted application may be received. When a set time elapses after the permission may be granted to the untrusted application by the user selection, the processor 120 may remove the permission granted to the untrusted application. In addition, the processor 120 may identify, at a set time interval, one or more of untrusted applications installed on the electronic device 101 and provide a list of the one or more of the identified untrusted applications and a notification window to notify the user of a security risk of the one or more of the identified untrusted applications. The processor 120 may output an interface screen for selecting whether to remove one or more of the identified untrusted applications. The list of the one or more of the identified untrusted applications may be provided to the user on a screen through a predetermined menu, and the user may view the list of the untrusted applications by selecting the predetermined menu and select and remove an application the user desires to remove from the list.

Figure 2:
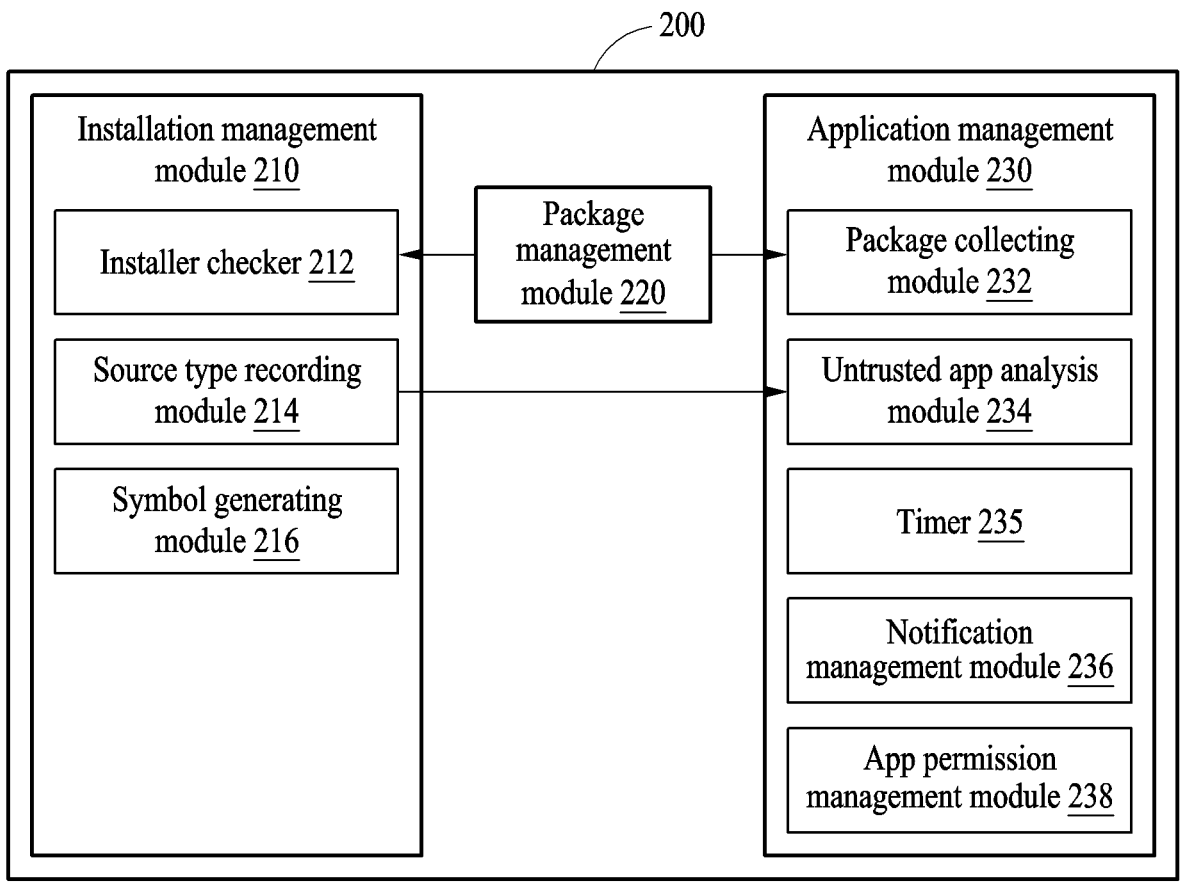
FIG. 2 is a block diagram illustrating a security management module for application security according to an embodiment of the disclosure.

FIG. 2 is a block diagram illustrating a security management module for application security according to an embodiment of the disclosure.

Referring to FIG. 2, a security management module 200 for application security may include an installation management module 210, a package management module 220, and an application management module 230. The security management module 200 may operate in the electronic device 101 of FIG. 1, and features and operations of each of components included in the security management module 200 may be performed by the processor 120 of the electronic device 101.

When installing an application on an electronic device (e.g., the electronic device 101 of FIG. 1), the installation management module 210 may classify a source type of the application and may determine whether the application is an untrusted application. The installation management module 210 may include an installer checker 212, a source type recording module 214, and a symbol generating module 216.

In response to receiving a request to install the application, the installer checker 212 may check an installer to install the application through a package management module 220. According to an embodiment, the installer checker 212 may check an installer through a module other than the package management module 220. An application installation file may have a file type of, for example, Android application package (APK).

According to an embodiment, the installer checker 212 may check an installer based on a package setting file (e.g., packages.xml) of the application managed by the package management module 220. The package setting file, as a file containing information on the application installation file, may provide meta information of the installation file. During the installation of the application, an installer field and an installInitiator field may be added to the package setting file corresponding to a system package database depending on an installation status of the application. According to another embodiment, the installer field may include information on a package that actually executes an installation operation, and the installInitiator field may include information on a package that sends an installation request. Information appearing in the installer field and the installInitiator field may be identical to or different from each other. While an installOriginator field may not be added to the package setting file during the installation of the trusted application, the installOriginator field in addition to the installer field and the installInitiator field may be added to the package setting file during the installation of the untrusted application. According to yet another embodiment, the installOriginator field may include information on a package used during actual installation of an application. The package setting file may include package information of all applications and information on permission used by each of the applications.

In an Android operating system, information appearing in the package setting file may vary according to the source type of the application. When the application is installed through Google Play Store, the installer field and the installInitiator field in a packages.xml file may respectively display 'com.android.vending' as information on a package that executes the installation operation and a package that sends the installation request. The installer field and installInitiator field may display identical information. When the application is installed through Galaxy Store, the installer field and installInitiator field in the packages.xml file may display 'com.sec.android.app.samsungapps'. When the application is installed through sideloading, the installer field and installInitiator field in the packages.xml file may respectively display 'com.google.android.packageinstaller' as information on the package that executes the installation operation of the application and the package that sends the installation request, and the installOriginator field may display package information used during the actual installation of the application. When the application is installed through a 'myfiles' program, the installOriginator field may display 'com.sec.android.app.myfiles'.

According to another embodiment, the installer checker 212 may classify the source type of the application based on a property of the package setting file according to the source type of the application. When values of the installer field and the installInitiator field are set to 'com.google.android.packageinstaller' in the package setting file of the application and the installOriginator field exists, the installer checker 212 may classify the application as an untrusted application. An untrusted application may be an application of which a source is not identified or trusted. When the installOriginator field does not exist in the package setting file of the application and an installation folder of the application is located in a folder (e.g., a /system/app folder or a subfolder of a /system/priv-app folder) in which a default application of a manufacturer or a telecommunication company is installed, the installer checker 212 may classify the application as a default application. A default application may be referred to as a 'preload application'. When the installOriginator field does not exist in the package setting file of the application and the installation folder of the application is not located in the /system/app folder or the subfolder of the /system/priv-app folder, the installer checker 212 may classify the application as a trusted application. In addition, when the application may be included in the allowlist, the installer checker 212 may classify the application as a trusted application even when the installOriginator field exists in the package setting file of the application. The allowlist may include, for example, list information on a package name and a signature value of an application used for a business-to-business (B2B) or a business-to-government (B2G) service. In response to a package name and signature value of an application corresponding to the package name and signature value included in the allowlist, the application may be classified as a trusted application regardless of information in the package setting file.

According to yet another embodiment, the installer checker 212 may classify the source type of the application as one of a trusted application, an untrusted application, and a default application based on a result of classifying the source of the application. The trusted application may be an application downloaded from an official application store (e.g., Google Play Store, Onestore, or Galaxy Store), and the default application may be a default program provided by a manufacturer and a telecommunication company of the electronic device 101. An untrusted application may be an application a user installs directly on the electronic device 101 through sideloading.

According to an embodiment, the source type recording module 214 may record the determined source type of the application in the package setting file (e.g., packages.xml) of the application. The source type recording module 214 may generate a package setting file including an installType field indicating the source type of the application, as well as the installer, installInitiator, and installOriginator fields. The source type recording module 214 may display a source type value on the installType field in accordance with a subject that installs the application. The source type value may be designated as one of 'Trusted' corresponding to a trusted application, 'Preload' corresponding to a default application, and 'Untrusted' (or 'Unknown Source') corresponding to an untrusted application. The package setting file in which the source type of the application is recorded may be transmitted from the source type recording module 214 to an app analysis module 234. According to another embodiment, the source type recording module 214 may also record and manage the source type of the application in a separate database.

According to yet another embodiment, the symbol generating module 216 may display a symbol (e.g., an icon and a mark) to provide notification of a risk of an application classified as an untrusted application. The symbol generating module 216 may display an icon capable of indicating that an application is an untrusted application as an icon of the untrusted application or may display a mark capable of indicating that the application is an untrusted application by overlaying the mark on the icon of the untrusted application. The user may recognize the risk of the application classified as an untrusted application through the displayed symbol. Among applications classified as an untrusted application, there may be an application that has no icon or is set not to output its icon on a screen. The symbol generating module 216 may forcibly display a symbol corresponding to the application on a screen. Through the symbol, the user may easily recognize that an untrusted application is installed.

In response to installation of an application being completed, the application management module 230 may manage the installed application. The application management module 230 may provide a security function that allows the user to safely use the installed application. The application management module 230 may manage applications classified as an untrusted application based on source types of the applications and notify the user of a risk of the applications. The application management module 230 may include a package collecting module 232, an untrusted app analysis module 234, a timer 235, a notification management module 236, and an app permission management module 238.

According to an embodiment, the package collecting module 232 may read packages of all applications installed on the electronic device (e.g., the electronic device 101 of FIG. 1) through the package management module 220. The untrusted app analysis module 234 may distinguish the untrusted application based on a source type value written on package setting information among the packages of all applications. According to another embodiment, the untrusted app analysis module 234 may distinguish an untrusted application based on a separate database in which information on the untrusted application is stored. The timer 235 may call one or more of components included in the application management module 230 according to a set time. The set time may change according to a user setting, and a time set for each of the components may be same or different from each other. The timer 235 may provide a notification function for notifying the user of a time point at which information on untrusted applications is to be provided or a time point at which permission the untrusted applications have is to be removed. The notification management module 236 may create and manage a notification to be provided to the user. The notification management module 236 may create a notification for notifying a user of a risk of an untrusted application or a notification for notifying of user that an untrusted application may be removed. The app permission module 238 may manage permission the untrusted application has. The app permission module 238 may remove (or retrieve) the permission the untrusted application has according to a user selection or a set time interval.

The security management module 200 described above may easily classify an application installed through sideloading such that the user is not attacked by malicious code embedded in the application. In addition, in response to receiving a request to grant a predetermined permission from an application installed from an untrusted source, the security management module 200 may notify the user of a risk that may be posed by granting the permission, and thereby damage caused by a malicious application may be reduced. The security management module 200 may accurately classify all installed applications as a trusted application or an untrusted application in a simple way and guide the user how to remove an application with a potential risk such that the user may use the electronic device in a safer environment.

Figure 3A:
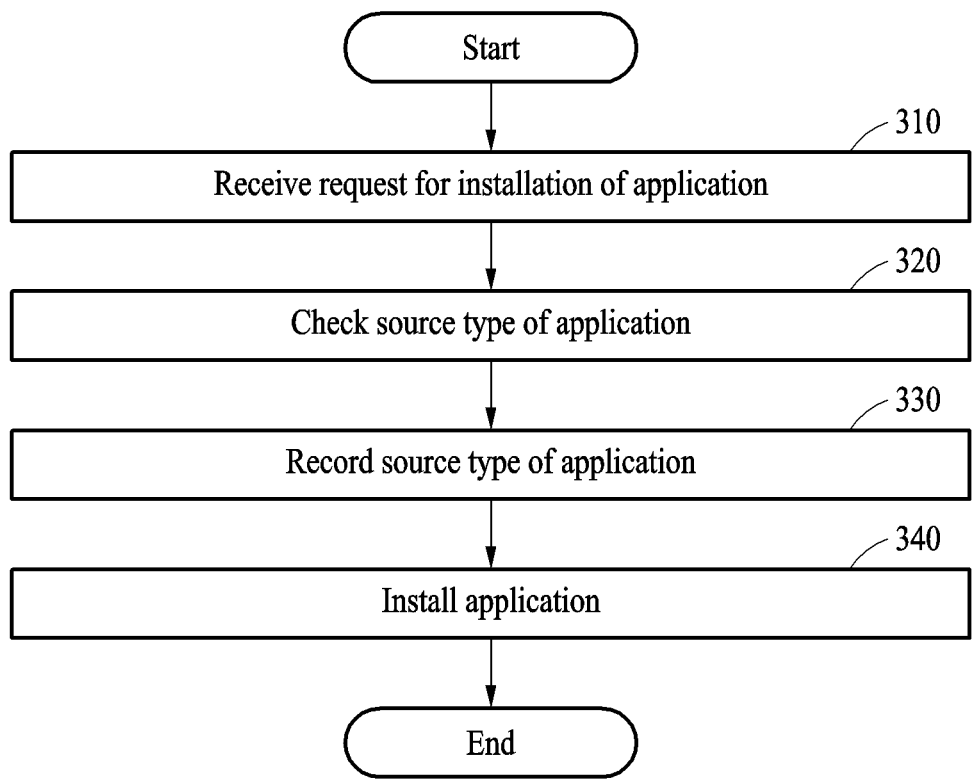
FIGS. 3A and 3B are flowcharts illustrating a process of installing an application in a method for application security according to various embodiments of the disclosure.
Figure 3B:
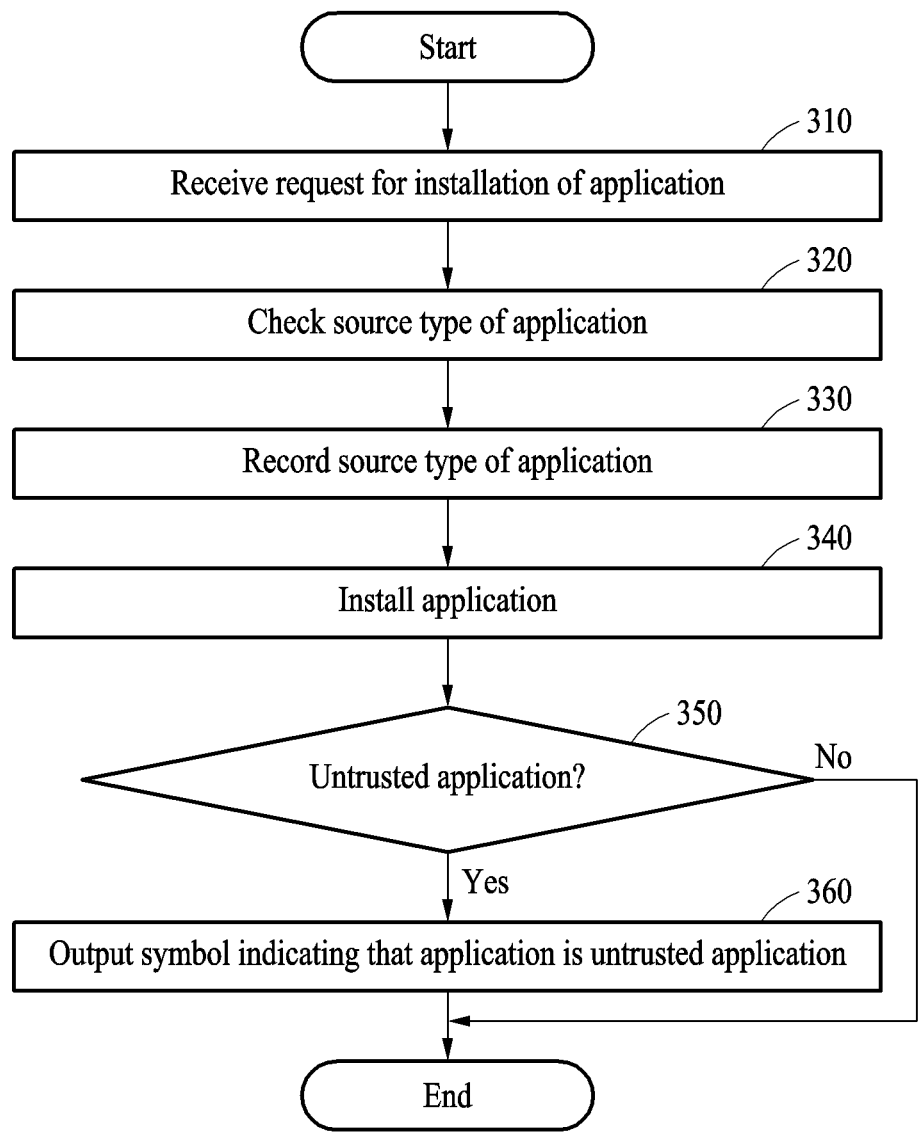

FIGS. 3A and 3B are flowcharts illustrating a process of installing an application in a method for application security according to various embodiments of the disclosure. A process of installing an application may be performed by the processor 120 (or the installation management module 210 of FIG. 2) of the electronic device 101 of FIG. 1.

Referring to FIG. 3A, the processor 120 may receive a request to install an application in operation 310. In operation 320, the processor 120 may check a source type of the application in response to receiving the request to install the application. In operation 330, the processor 120 may record the source type of the application based on a source of the application. The processor 120 may determine the source type of the application based on source information of the application appearing in a package setting file (e.g., packages.xml) of the application and record the determined source type in the package setting file (e.g., packages.xml). The processor 120 may identify a source (e.g., 'com.google.android.packageinstaller', 'com.android.vending', 'com.sec.android.app.samsungapps', etc.) of the request to install the application through a package management module (e.g., the package management module 220 of FIG. 2) at a time point at which the application is being installed. The processor 120 may classify the source type of the application as one of a trusted application, an untrusted application, and a default application based on the source information of the application. A trusted application may be an application of which a source may be trusted, and a default application may be an application that may itself be trusted. An untrusted application may be an application of which a source may not be trusted and that may itself not be trusted. In response to the application being included in an allowlist, a list of trusted applications, the processor 120 may determine the application to be a trusted application regardless of the source type of the application. In addition, in response to the application corresponding to a default application, the processor 120 may treat the application as a trusted application regardless of the source type of the application. The processor 120 may record and store a classified source type of the application in an installType field in the package setting file of the application. According to an embodiment, the processor 120 may record the source type of the application in a separate database. In operation 340, the application may be installed on an electronic device (e.g., the electronic device 101 of FIG. 1).

Figure 4A:
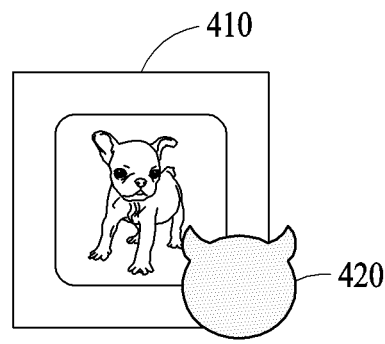
FIGS. 4A and 4B are diagrams illustrating examples of implementing a symbol indicating that an application is an untrusted application according to various embodiments of the disclosure.
Figure 4B:
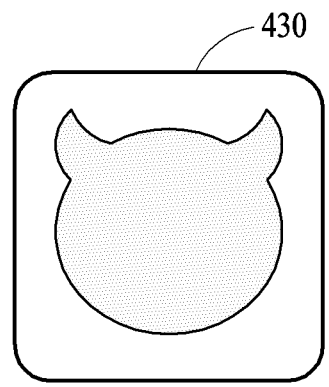

The process of installing the application illustrated in FIG. 3A may be expanded like an example embodiment of FIG. 3B. Referring to FIG. 3B, operations 310 through 340 correspond to operations 310 through 340 of FIG. 3A, and thus any repeated description has been omitted. In operation 350, the processor 120 may determine whether the source type of the application corresponds to an untrusted application. In response to the source type of the application corresponding to a trusted application or a default application, the processor 120 may end the process of installing the application without performing operation 360. In response to the source type of the application corresponding to an untrusted application (i.e., operation 350 being YES), in operation 360, the processor 120 may output, on a screen, a symbol (e.g., an icon or a mark) indicating that the application is an untrusted application. The processor 120 may output the symbol by overlaying the symbol on an icon of the application or output only the symbol without outputting the icon of the application. As such, the processor 120 may set and display a symbol capable of indicating a risk of the untrusted application. To output the symbol, the processor 120, for example, may change the icon of the application to the symbol through a launcher and output the symbol or replace an actual icon file of an installed application with a corresponding symbol file. FIGS. 4A and 4B illustrate examples of implementing a symbol.

FIGS. 4A and 4B are diagrams illustrating examples of implementing a symbol indicating that an application is an untrusted application according to various embodiments of the disclosure.

Referring to FIG. 4A, it illustrates an implementation example of displaying a symbol 420 indicating that an application is an untrusted application by overlaying the symbol on an icon 410 of the application. Referring to FIG. 4B, it illustrates an implementation example of replacing the icon of the application with a symbol 430 without outputting the actual icon of the application. When an application classified as an untrusted application is an application for which an icon is not generated, the symbol 430 may be displayed as the icon of the application as illustrated in FIG. 4B.

Through the symbol 420 or the symbol 430, a user may easily identify an application installed from an unknown source and pay more attention to security when using the application. Some malicious applications may be provided without an icon such that the malicious applications are hidden after the malicious applications are installed. The symbol 430 may be displayed as an icon of a corresponding application as illustrated in FIG. 4B, such that the user may effectively recognize the presence of the application.

Figure 5:
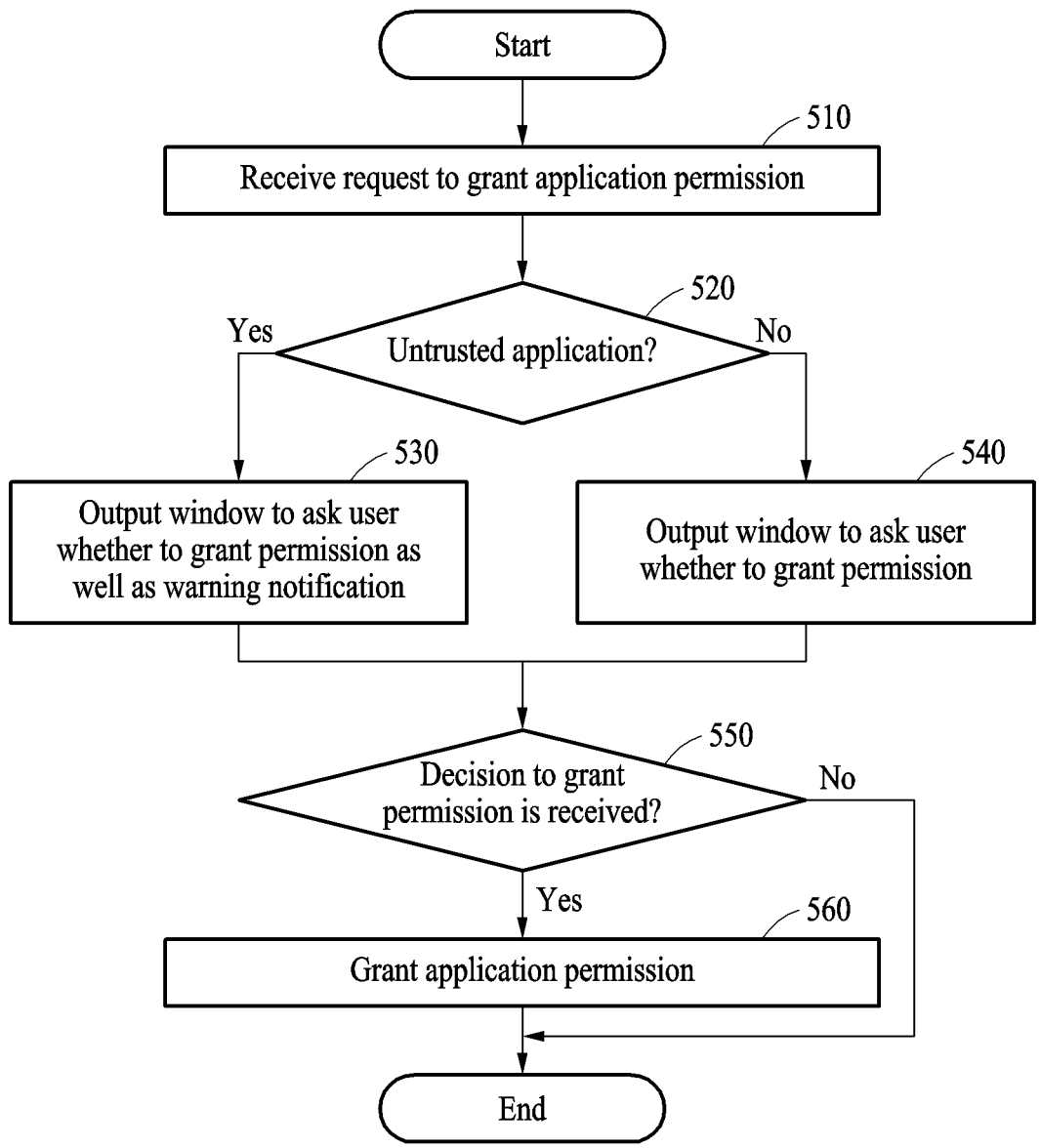
FIGS. 5, 6, and 7 are flowcharts illustrating security functions for an untrusted application according to various embodiments of the disclosure.
Figure 6:
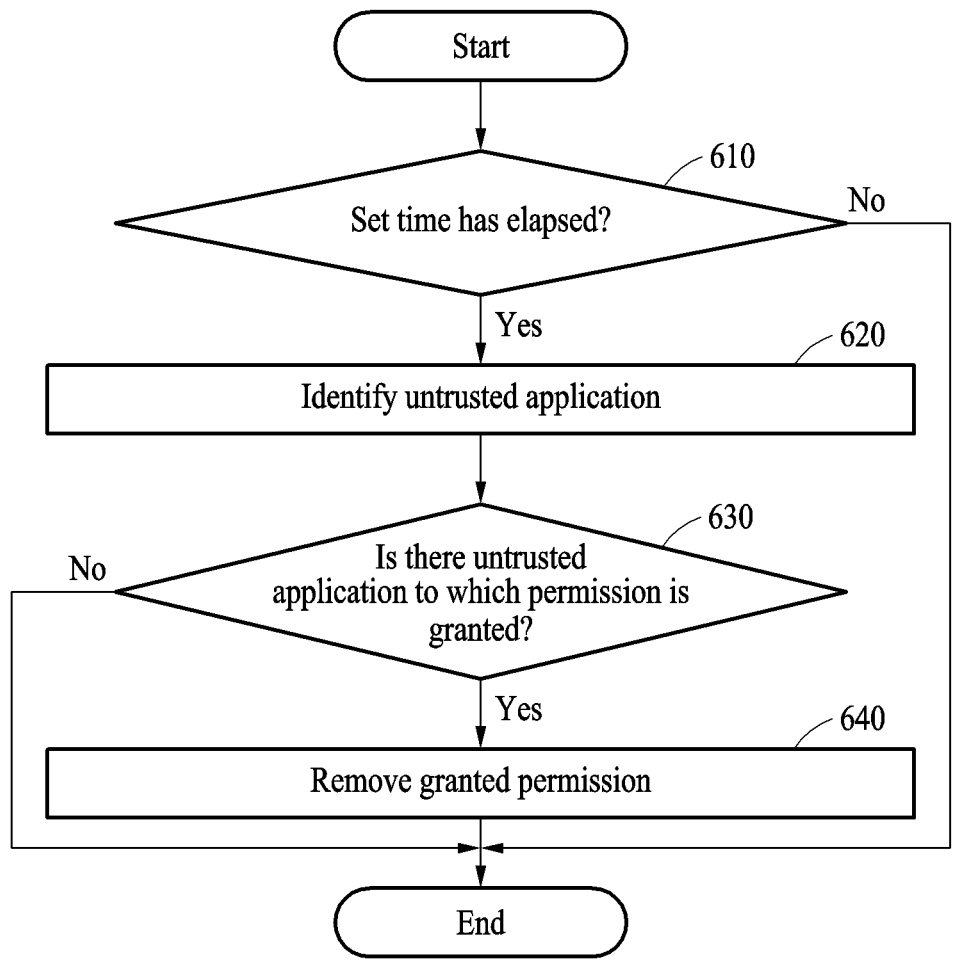
Figure 7:
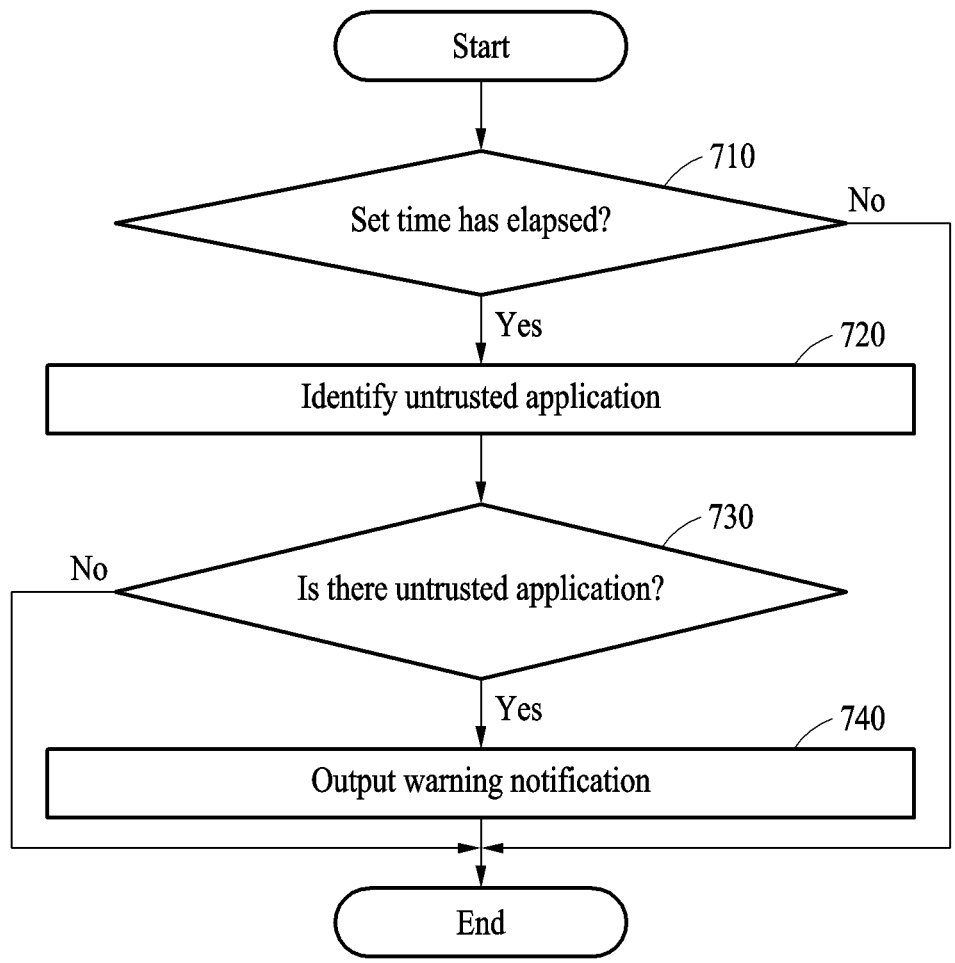

FIGS. 5, 6, and 7 are flowcharts illustrating security functions for an untrusted application according to various embodiments of the disclosure. Security functions for an application may be performed by the processor 120 (or the application management module 230 of FIG. 2) of the electronic device 101 of FIG. 1.

FIG. 5 is a flowchart illustrating a security function for a request to grant an application permission according to an embodiment of the disclosure. Referring to FIG. 5, in operation 510, the processor 120 may receive a request to grant permission to access information from an application. A request to grant permission may be a request to grant permission to search for or use personal information (e.g., location, contacts, messages, etc.) of a user and a folder or use a device such as a camera or a microphone. The request to grant permission may be made at a time when the application may be being executed or after the application has been executed.

In response to receiving the request to grant permission from the application, in operation 520, the processor 120 may determine whether the application corresponds to an untrusted application based on a source type of the application. The processor 120 may determine that the application is an untrusted application (i.e., operation 520 being YES) in response to a source type value of an installType field in a package setting file being set to 'Untrusted'. In response to the application not corresponding to an untrusted application (in response to the source type of the application corresponding to a trusted application or a default application), in operation 540, the processor 120 may output a window (e.g., a dialog or a pop-up) to ask a user whether to grant permission to the application. The window may be implemented as a window, which may be generally used, to ask for Android runtime permission.

In response to the application corresponding to an untrusted application, the processor 120 may perform one or more of security functions set for an untrusted application. The processor 120 may perform a function of outputting a notification window, as one of the security functions, to notify the user of a security risk of the untrusted application. In addition, the processor 120, in operation 530, may output a window to ask the user whether to grant permission to the application, as well as a warning notification to warn the user about the risk of the untrusted application. The warning notification may include a message saying that, for example, an application that sent a request to grant permission is from an unknown source, so there may be a risk of personal information leakage or a malicious code attack.

In operation 550, the processor 120 may determine whether a decision to grant permission to the application is received through a user selection. In response to the decision to grant permission not being received due to the user refusing to grant permission, the application may be terminated or executed without the permission having been obtained. In response to permission being granted to the application by the user selection (i.e., operation 550 being YES), in operation 560, the processor 120 may grant the permission that the application asked for, and the application may operate in a permission granted state. The processor 120 may perform a function of outputting a selection window, as one of the security functions, to receive, from the user, a selection of whether to grant permission to an untrusted application whenever a request to execute an untrusted application is received. Security may be improved by asking the user whether to grant permission to an untrusted application whenever the untrusted application is to be executed instead of continuously granting permission that is once granted to the untrusted application. Even when permission to access personal information is granted to an untrusted application, the processor 120 may not permit the untrusted application to access information on user identity or important information or may prevent the information from being provided. When the untrusted application has permission to access a text message, the processor 120 may prevent the untrusted application from accessing information, such as personal information or authentication numbers included in the text message, or transmit data from which corresponding information has been deleted to the untrusted application.

FIG. 6 is a flowchart illustrating a security function for permission granted to an untrusted application according to an embodiment of the disclosure. Referring to FIG. 6, in operation 610, the processor 120 may check whether a set time (e.g., an hour, 12 hours, a day, a week, etc.) has elapsed. A corresponding time may be changed by a user selection.

In response to the set time elapsing (i.e., operation 610 being YES), in operation 620, the processor 120 may identify an untrusted application among applications installed on an electronic device (e.g., the electronic device 101 of FIG. 1) The processor 120 may obtain a list of all applications installed on the electronic device through a package management module (e.g., the package management module 220 of FIG. 2) and analyze a package setting file (e.g., packages.xml) to identify applications classified as an untrusted application among all applications.

In operation 630, the processor 120 may determine whether there is an untrusted application to which one or more of types of permission is granted. In response to a determination that there is an untrusted application to which one or more of types of permission is granted among the applications classified as an untrusted application (i.e., operation 630 being YES), in operation 640, the processor 120 may remove (or retrieve) permission granted to the untrusted application. The processor 120 may remove permission granted to an untrusted application when a set time elapses after permission has been granted to the untrusted application by a user selection. Accordingly, it may be possible to prevent an untrusted application to which permission has been granted once from continuously performing a malicious action.

FIG. 7 is a flowchart illustrating a security function that periodically provides a warning notification about an untrusted application according to an embodiment of the disclosure. Operations 710 and 720 of FIG. 7 respectively correspond to operations 610 and 620 of FIG. 6, and thus any repeated description has been omitted.

In operation 730, the processor 120 may determine whether there is an untrusted application. The processor 120 may identify one or more of untrusted applications installed on an electronic device (e.g., the electronic device 101 of FIG. 1) at a set time interval.

In response to presence of an untrusted application (i.e., operation 730 being YES), in operation 740, the processor 120 may output a warning notification. The processor 120 may provide, to a user, a list of one or more of the identified untrusted applications and a notification window to notify the user of a security risk of one or more of the untrusted applications. According to an embodiment, the processor 120 may output an interface screen for selecting whether to remove one or more of the identified untrusted applications. Accordingly, the processor 120 may periodically provide a list of untrusted applications installed on the electronic device based on a recorded source type of an application and provide a function allowing easy removal of the untrusted applications.

Figure 8A:
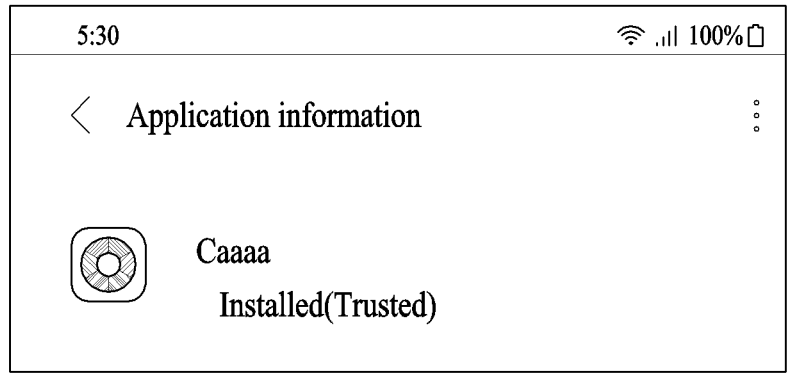
FIGS. 8A and 8B are diagrams illustrating implementation examples of providing source type information of an application according to various embodiments of the disclosure.
Figure 8A:
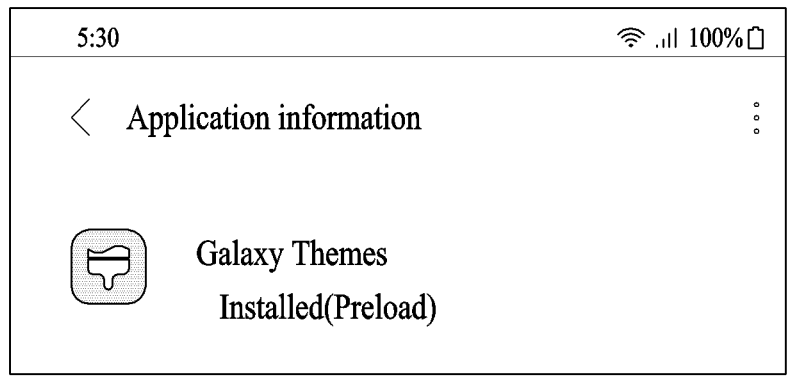
Figure 8A:
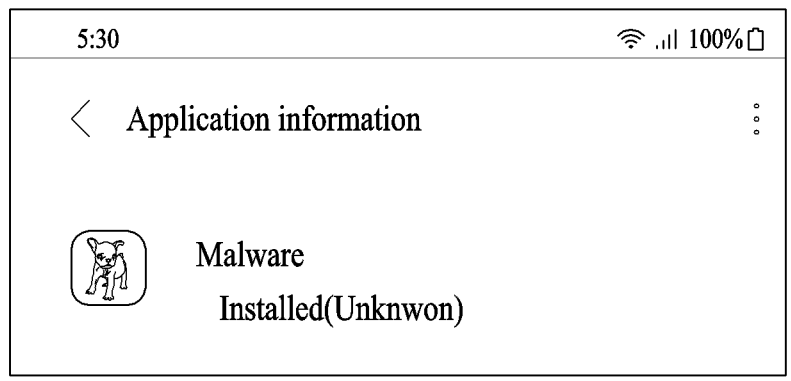
Figure 8B:
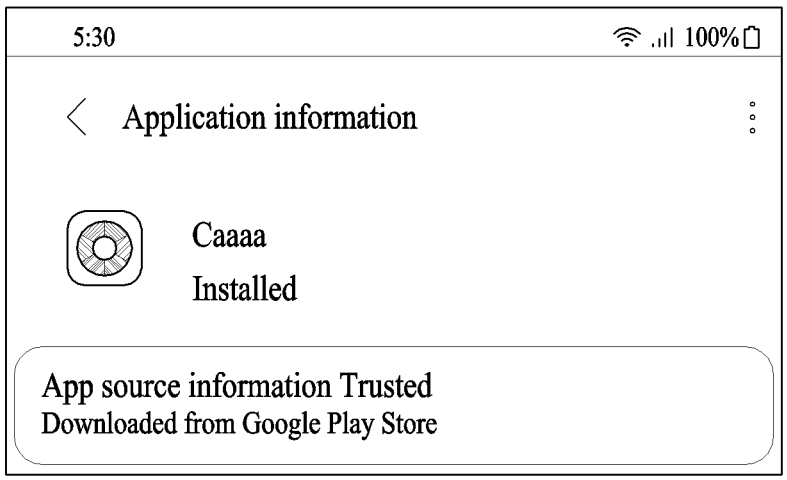
Figure 8B:
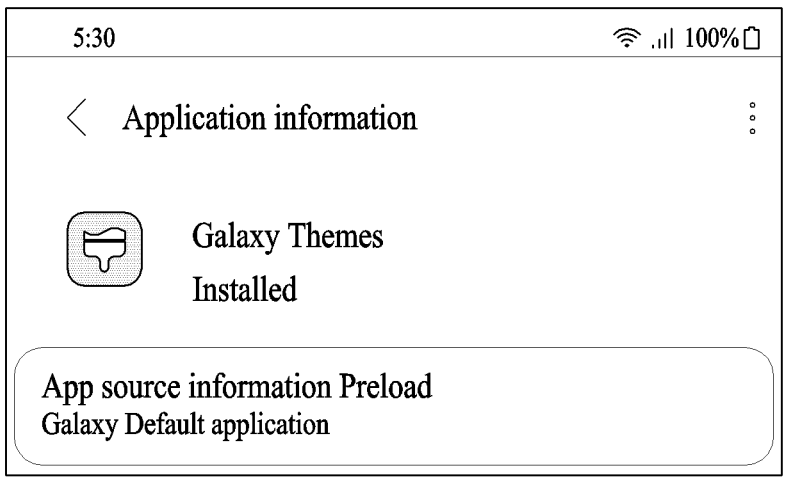
Figure 8B:
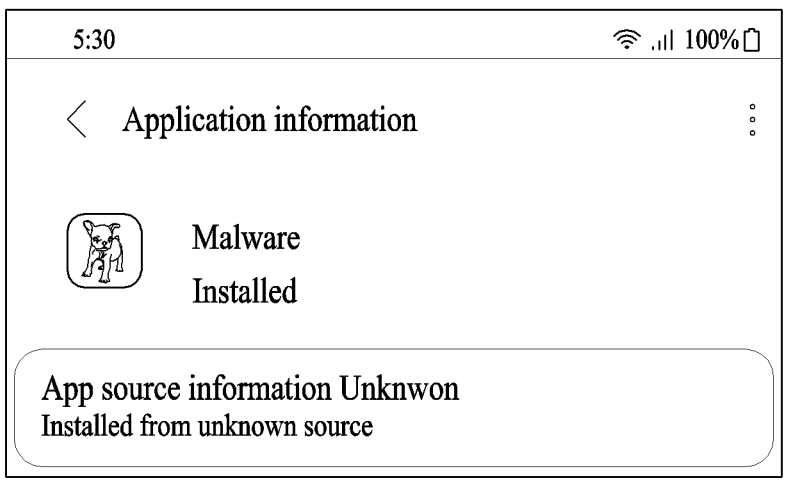

FIGS. 8A and 8B are diagrams illustrating implementation examples of providing source type information of an application according to various embodiments of the disclosure.

The processor 120 may provide application information containing a source type of an application to a user. The source type of the application may be displayed around an item indicating an installation status of the application in an application information menu of each application as illustrated in FIG. 8A and may be displayed around an item indicating source information of the application as illustrated in FIG. 8B. For example, a source type of a trusted application may be displayed as 'Trusted' as illustrated in part (a) of FIG. 8B, a source type of a default application may be displayed as 'Preload' as illustrated in part (b) of FIG. 8B, and a source type of an untrusted application may be displayed as 'Unknown' as illustrated in part (c) of FIG. 8B. According to one embodiment, the processor 120 may provide a list of applications classified as an untrusted application through a menu item or may automatically place the applications classified as an untrusted application in a predetermined folder of the electronic device to group the untrusted applications.

According to example embodiments described above, a user may use an electronic device (e.g., the electronic device 101 of FIG. 1) more safely while using an Android operating system in which applications from various sources may be installed. Example embodiments may classify applications from an unknown source, which may include malicious code, and perform one or more of security functions for the corresponding applications to provide an environment in which the user may use the electronic device more safely.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. According to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more of instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more of functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   memory configured to store computer-executable instructions; and at least one processor communicatively coupled to the memory, wherein the computer-executable instructions, when executed by the at least one processor individually or collectively, cause the electronic device to:
- record a source type of an application based on a source of the application when installing the application on the electronic device,
- determine whether the application corresponds to an untrusted application based on the source type of the application, and
- in response to the application corresponding to an untrusted application and an icon of the application being present:
  - output, on a screen, a symbol indicating that the application is the untrusted application by overlaying the symbol on the icon of the application or output the symbol without outputting the icon.

2. The electronic device of claim 1, wherein the computer-executable instructions further include instructions that, when executed by the at least one processor individually or collectively, cause the electronic device to determine the source type of the application based on source information of the application appearing in a package setting file of the application.

3. The electronic device of claim 2, wherein the computer-executable instructions further include instructions that, when executed by the at least one processor individually or collectively, cause the electronic device to classify the source type of the application as one of a trusted application, an untrusted application, and a default application based on the source information of the application.

4. The electronic device of claim 1, wherein the computer-executable instructions further include instructions that, when executed by the at least one processor individually or collectively, cause the electronic device to, in response to the application being included in an allowlist that is a list of trusted applications, determine that the application is a trusted application regardless of the source type of the application.

5. The electronic device of claim 1,
wherein the computer-executable instructions further include instructions that, when executed by the at least one processor individually or collectively, cause the electronic device to, in response to the application corresponding to a default application, treat the application as a trusted application regardless of the source type of the application, and
wherein a default application is an application pre-loaded in the electronic device by a manufacturer of the electronic device.

6. The electronic device of claim 1, wherein the computer-executable instructions further include instructions that, when executed by the at least one processor individually or collectively, cause the electronic device to:
- in response to the application corresponding to the untrusted application and the icon of the application being absent, output only the symbol.

7. The electronic device of claim 1, wherein the computer-executable instructions further include instructions that, when executed by the at least one processor individually or collectively, cause the electronic device to, in response to the application corresponding to the untrusted application, perform a function of outputting a notification window to notify a user of a security risk of the untrusted application.

8. The electronic device of claim 1, wherein the computer-executable instructions further include instructions that, when executed by the at least one processor individually or collectively, cause the electronic device to, in response to the application corresponding to the untrusted application, perform a function of outputting a selection window to receive, from a user, a selection of whether to grant permission to the untrusted application whenever a request to execute the untrusted application is received.

9. The electronic device of claim 1, wherein the computer-executable instructions further include instructions that, when executed by the at least one processor individually or collectively, cause the electronic device to, in response to the application corresponding to the untrusted application, perform a function of removing permission granted to the untrusted application when a set time elapses after permission is granted to the untrusted application by a user selection.

10. The electronic device of claim 1, wherein the computer-executable instructions further include instructions that, when executed by the at least one processor individually or collectively, cause the electronic device to, in response to the application corresponding to the untrusted application, at a set time interval, perform a function of identifying one or more of untrusted applications installed on the electronic device and providing a list of the identified one or more of the untrusted applications and a notification window to notify a user of a security risk of the identified one or more of the untrusted applications.

11. The electronic device of claim 10, wherein the computer-executable instructions further include instructions that, when executed by the at least one processor individually or collectively, cause the electronic device to output an interface screen for selecting whether to remove the identified one or more of the untrusted applications.

12. The electronic device of claim 1, wherein the computer-executable instructions further include instructions that, when executed by the at least one processor individually or collectively, cause the electronic device to provide application information containing the source type of the application to a user.

13. A method performed by an electronic device for application security, the method comprising:
- receiving a request to install an application;
- recording a source type of the application based on a source of the application in response to receiving the request to install the application;
- installing the application on an electronic device;
- determining whether the application corresponds to an untrusted application based on the source type of the application; and
- in response to the application corresponding to an untrusted application and an icon of the application being present:
  - outputting, on a screen, a symbol indicating that the application is the untrusted application by overlaying the symbol on the icon of the application or outputting the symbol without outputting the icon.

14. The method of claim 13, wherein the recording of the source type of the application comprises classifying the source type of the application as one of a trusted application, an untrusted application, and a default application based on source information of the application appearing in a package setting file of the application.

15. The method of claim 13, further comprising:
- in response to the application corresponding to the untrusted application, performing a function of outputting a selection window to receive, from a user, a selection of whether to grant permission to the untrusted application whenever a request to execute the untrusted application is received.

16. The method of claim 13, further comprising:

in response to the application corresponding to the untrusted application, identifying, at a set time interval, one or more of untrusted applications installed on the electronic device; and providing a list of the identified one or more of the untrusted applications and a notification window to notify a user of a security risk of the identified one or more of the untrusted applications.

17. One or more non-transitory computer-readable storage media storing computer-executable instructions that, when executed by at least one processor of an electronic device individually or collectively, cause the electronic device to perform operations, the operations comprising:

receiving a request to install an application;

recording a source type of the application based on a source of the application in response to receiving the request to install the application;

installing the application on an electronic device;

determining whether the application corresponds to an untrusted application based on the source type of the application; and in response to the application corresponding to an untrusted application:

outputting, on a screen, a symbol indicating that the application is the untrusted application by overlaying the symbol on an icon of the application or outputting the symbol without outputting the icon.

18. The method of claim 13, wherein the outputting of the symbol comprises:

in response to the icon of the application being absent, outputting only the symbol.

19. The method of claim 13, further comprising:

in response to the application corresponding to a default application, treating the application as a trusted application regardless of the source type of the application, wherein a default application is an application pre-loaded in the electronic device by a manufacturer of the electronic device.

* * * * *